United States Patent
Page

[11] 3,799,014
[45] Mar. 26, 1974

[54] CENTERING CUTTING APPARATUS

[76] Inventor: Michael Page, 2303 Hardee Rd., Kinston, N.C. 28051

[22] Filed: Sept. 29, 1972

[21] Appl. No.: 293,488

[52] U.S. Cl............... 83/83, 83/105, 83/110, 83/156, 83/422, 83/423, 83/425.3, 83/435.2
[51] Int. Cl............... B26d 3/12, B65h 35/02
[58] Field of Search....... 83/83, 105, 110, 156, 422, 83/423, 425.3, 425, 435.2

[56] References Cited
UNITED STATES PATENTS

| | | | |
|---|---|---|---|
| 3,722,343 | 3/1973 | Cornell | 83/423 X |
| 290,711 | 12/1883 | Seymour | 83/425.3 |
| 2,590,700 | 3/1952 | Hochman | 83/423 X |

*Primary Examiner*—Frank T. Yost
*Attorney, Agent, or Firm*—Connolly and Hutz

[57] ABSTRACT

An operator impales the center of the central design of an elongated strip of material over a row of pins protruding upwardly from an endless belt through a slot in an elongated table. Movement of the conveyor pins feeds the strip to a pair of circular cutters which straddle their path, and evenly trims the strip to a predetermined width upon which the impaled design is centered. The conveyor is operated at a relatively slow speed, such as about one foot per minute, to give the operator enough time to impale several successive strips on the pins, which are spaced about a foot apart, as they proceed toward the cutters. The trimmed strip is raised off the pins and discharged through a pair of weakly opposed feed rollers onto a reciprocating stacker coordinated with the pins, which receives and grasps each strip as it is discharged and draped over it.

22 Claims, 3 Drawing Figures

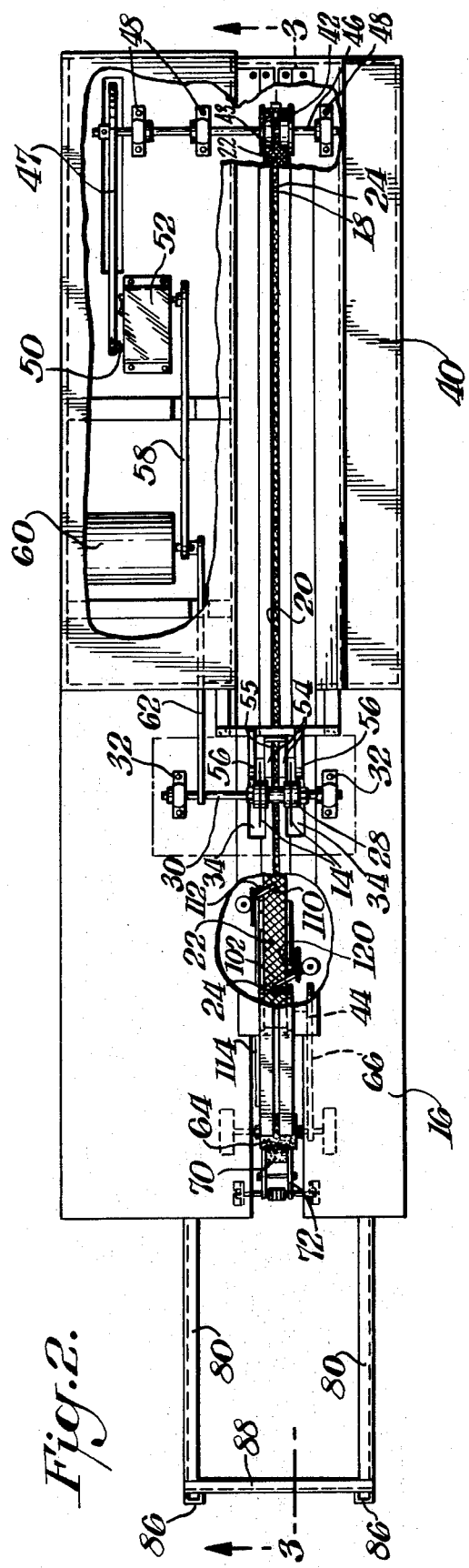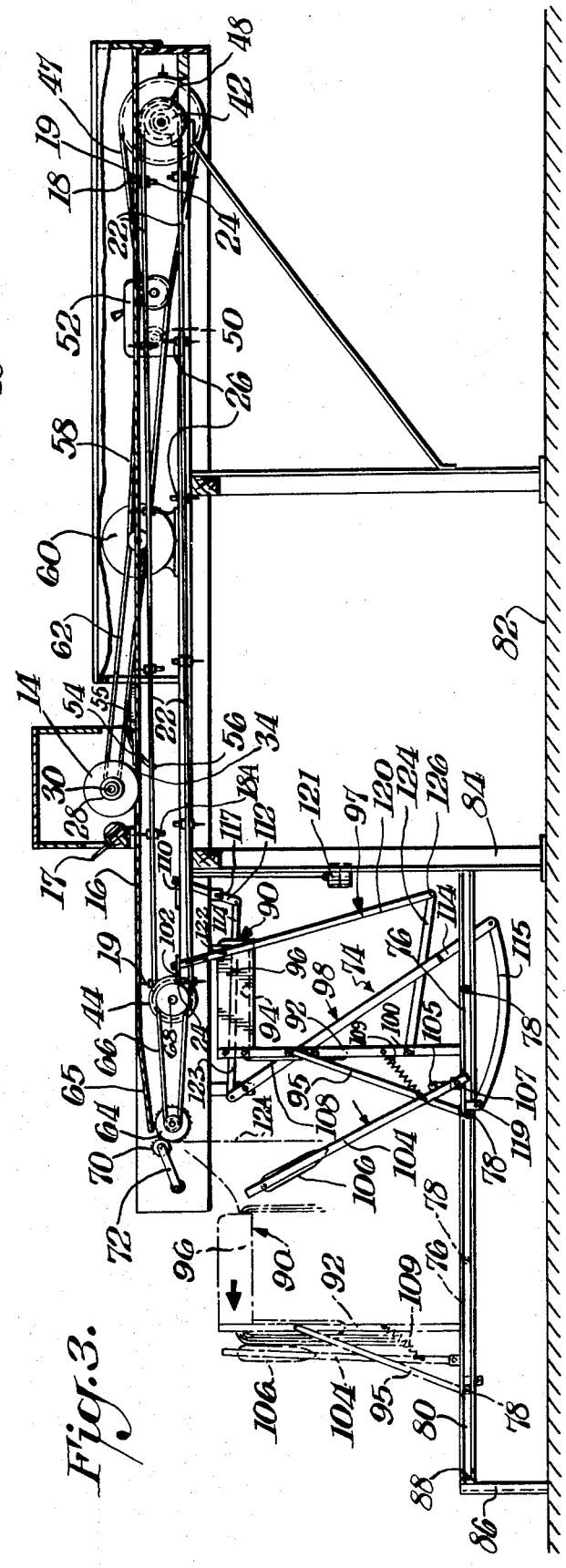

CENTERING CUTTING APPARATUS

BACKGROUND OF THE INVENTION

The center bands of shirts having a longitudinal design such as decorative stripes must have their button holes pass through the center of the bands. It has therefore become necessary to evenly cut the sides of the strips on either side of the center line. This has increased the care, time and cost necessary to trim these strips. An object of the invention is to provide an efficient apparatus which evenly trims the sides of a strip of material on either side of its centerline in a simple and economical manner and which conserves labor time and expense.

SUMMARY OF THE INVENTION

In accordance with this invention, a longitudinal line patterned conveyer has a loading section for aligned application of linearly designed strips of material, such as with their center design aligned with the center line of the conveyor. The conveyor carries the strips from the loading area to a trimming station having cutting means mounted adjacent the conveyor for trimming excess material from the side of the strip, for example, a pair of cutters straddling the conveyor. The trimmed strips are then discharged from the conveyor. The line pattern of the conveyor is comprised for example, by a row of pins protruding upwardly from a conveyor belt, for example, through a narrow slot in an elongated loading table. The centers of the center design of the strips are, for example, impaled on the pins which are not moving at a speed which prevents accurate alignment with the conveyor, such as a slow speed of from about six inches to sixty inches per minute. Accurate cutting is facilitated by gently urging the strips in contact with the table as they proceed through the cutters and gently diverting the trimmed excess edges downwardly through a well in the table containing the cutters. The pins are efficiently disengaged from the material after proceeding through the cutters by inclining the conveyor downwardly away from the table and continuing the forward movement of the strips through a loose drive which acts, for example, through a loose friction to propel the leading ends of the strips off the table. A reciprocal stacking apparatus, coordinated with the conveyor, grabs the leading end of each discharged strip and snatches the trailing end out of the loose frictional drive — and drapes each strip successively over a receiving saddle. The stacker is effectively mounted upon a carriage which is simply and efficiently reciprocated by a motion multiplying linkage actuated by successive contact with each pin on the conveyor. Positive opening return movement of the stacker is facilitated, for example, by a counterweight.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which:

FIG. 2 is a top plan view of the embodiment of a portion of which is shown in FIG. 1; and FIG. 3 is a cross-sectional view taken through FIG. 2 along the line 3—3 showing two positions of the stacking assembly.

DESCRIPTION OF THE PREFERRED EMBODIMENT

Figure 1:
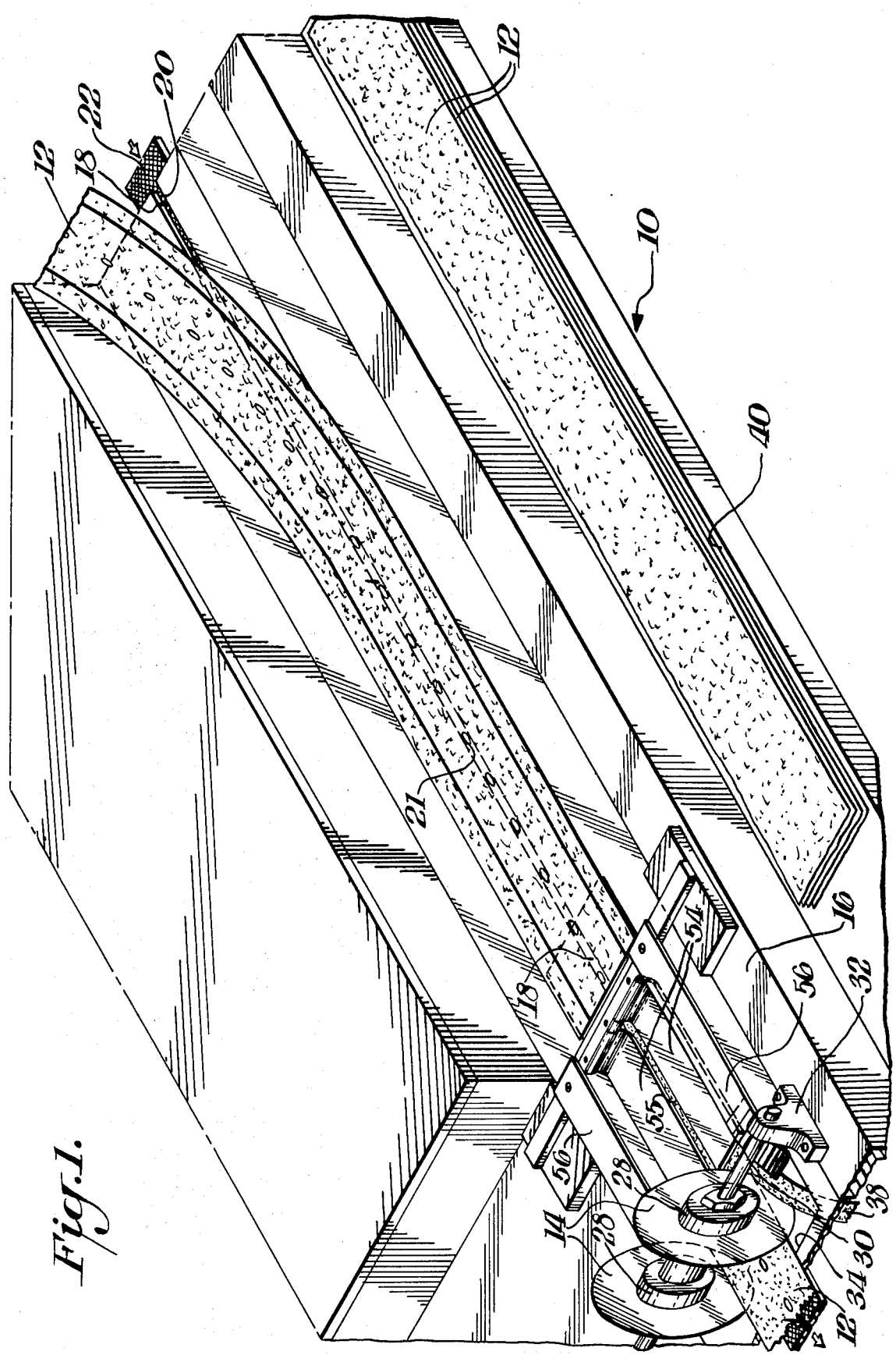
FIG. 1 is a three-dimensional view of a portion of one embodiment of this invention to which a strip of fabric is being centerpinned for centered cutting.

In FIG. 1 is shown a portion of a centering fabric cutting apparatus 10 upon which a strip of fabric 12 is being applied for centered cutting by a pair of circular cutters 14. Strips 12 are placed on table 16 and centrally impaled on the points 18 of pins 19 protruding outwardly through slot 20. Points 18 thus run through the center of center design stripe 21. Pins 19 are, for example, mounted about 1 foot apart or more particularly 13-½ inches apart on endless conveyor belt 22. As more clearly shown in FIG. 3, the heads 24 of pins 19 are disposed on the inside of belt 22 and their outwardly extending sharp ends or points 18 pass through belt 22 and are secured to it by locking washers 26.

Circular cutters 14 are, for example, similar to circular saws and they are mounted by suitable mounting nuts and collars 28 on arbor 30 which is rotatably mounted in bearings 32 secured to the top of table 16. As shown only in FIG. 3, a pivoted sharpening assembly 17 is mounted adjacent cutters 14, including two pairs of conical sharpening stones for engagement with both sides of the cutting edges of cutters 14 when necessary to sharpen them. Table 16 includes a well 34 to provide clearance for cutters 14 and for receiving the trimmed outer edges 38 of fabric strip 12, which drop into a trash bin (not shown) to be discarded. As also shown in FIG. 1, a stack of untrimmed strips 12 of fabric is conveniently stored on front shelf 40 a short distance below and in front of table 16—ready for successive impalement over pin points 18 by an operator (not shown).

Endless conveyor belt 22, for example, is a conventional leather, synthetic or composite type of conveyor belt running about split pulley sheaves 42 and 44, each having a central gap 43 to permit passage of pin heads 24. Sheave 44 is mounted on shaft 46 rotatably supported in three bearings 48. The end of shaft 46 is driven by V-belt and pulley assembly 47 which connects output shaft 50 of variable speed reducer 52 with shaft 46. The input drive to speed reducer 52 is provided through a similar V-belt and pulley drive 58.

Speed reducer 52 is, for example, of the hydraulic type and has a range of variation at least capable of converting normal motor speed of approximately 3,000 r.p.m. through illustrated pulley drives to longitudinal pin speeds ranging, for example, from about 6 inches to about 60 inches per minute. In the continuously operating form of this invention, the belt speed is adjusted to traverse pins, spaced, for example, 13-½ inches apart, at a longitudinal speed of from about 6 to 60 inches per minute. A longitudinal speed of 40-½ inches per minute is particularly efficient. This relatively slow speed permits an operator to pin a substantial number of strips on a portion of the belt before it reaches cutters 14, such as about twenty layers after at least three successive pin heads are loaded in starting operation on an unloaded conveyor.

In loading, the operator places the leading edge of each strip near a pin to coordinate it to be uniformly snatched by the stacking assembly, later described. The leading edge is thus placed with the first pin about one-half inch from its edge. For strips from about 28 to 32 inches long, about one-half to 4 inches overhangs the last of the three pins through each strip. At the aforementioned 40-½ inch belt speed, an average operator can start about six to 10 strips on each pin and thus overlap about 18 to 30 layers in staggered array on the moving pins.

This apparatus is also capable of being intermittently operated in which a stack of strips of any effective height may be impaled while the belt is stationary. The belt may then be started to traverse the centered stack of strips through the cutters.

Electric motor 60 is also connected to drive cutter arbor 30 through V-belt assembly 62, which, for example, rotates cutters 14 at approximately the speed of electric motor 60. Discharge roller 64 at the end of table 16 is rotated at about three times the surface speed of pin points 18 by V-belt drive 66 connected to shaft 68 of sheave 44 supporting the discharge end of conveyor belt 22. Roller 64 has a frictional surface, for example, provided by a suede cover for grasping and loosely pulling strips of cloth in the forward direction in conjunction with auxiliary gripping roller 70 rotatably mounted on pivot arm 72 resting in light contact with the outside of strip 12A of fabric (shown in phantom outline) being discharged from the end of table 16. Roller 70 is also suede covered to help it grip and discharge fabric in conjunction with roller 64. Rollers 64 and 70 thus comprise a loose frictional drive capable of slipping while strip 12 is more positively engaged before and after it as later described.

Fabric strips 12 are maintained firmly pressed against table 16 as they engage cutters 14 by hinged presserfoot 54 resting upon strips 12 and extending slightly into the gap between cutters 14. Presserfoot 54 has central slot 55 to permit pin points 18 to pass between its legs. A pair of spring fingers 56 mounted parallel to presserfoot 54 and outside of cutters 14 force the trimmed edges 38 of strip 12 down through well 34 into a bin (not shown) for discarding them.

Belt 22 is inclined downwardly from the receiving to the discharging end of table 16, so that pin points 18 drop below the top of table 16 after they pass cutters 14 and thus withdraw from strips 12 at about pin point 18A. By this time the leading end of strips 12 have entered between loose frictional drive rollers 64 and 70 which urge them down inclined track 65 toward stacking assembly 74. The interleaving of successive strips 12 in a staggered stack on table 16 also helps feed strips 12 through cutters 14 and into the nip between discharge rollers 64 and 70. After the trailing end of strip 12A (shown in FIG. 3) clears engagement with its last pin point 18, rollers 64 and 70 accelerate it to where its leading end is ready to be grabbed and snatched off by stacking or stacker assembly 74.

Stacker assembly 74 is mounted under the discharge end of table 16. It includes a reciprocating carriage 76 mounted to slide back and forth on rollers 78 which engage tracks 80 mounted a short distance above floor 82. Tracks 80 have one end attached to table legs 84 and outer ends mounted on auxiliary legs 86 connected by horizontal bar 88. Saddle 90 is mounted upon carriage 76 on vertical legs 92 which are braced by slanted legs 95. Saddle 90 includes top shelf 94 upon which successive strips are stacked, side plates 96 which prevent strips 12 from sliding sidewise off shelf 94, and front skirt 108 against which the leading ends are clamped. Gripping pad 106 on arm 104 and pad 108 are, for example, made of suede similar to that covering rollers 64 and 70.

When the next pin head 24 contacts horizontally pivoted actuating arm 102, it moves it against top of link 120 which is rotatably connected at pivot 122 below table 16. Linkage 97 also includes pivoted link 124 which in turn is pivoted to leg 92 on saddle assembly 90 at 100. Link 124 is rotatably connected to link 120 by pivot 126. Movement of the top of link 120 in the clockwise direction about pivot 122 correspondingly rotates lower pivot 126 and connecting link 124 to drive carriage 76 to the forward phantom outline position shown in FIG. 3.

As carriage 76 and clamping arm 104 move ahead and away from bumper 105, clamping arm 104 rapidly rotates clockwise toward saddle assembly 90 to thus grab the leading end of strip 12A between pad 106 on arm 104 and padded skirt 108 on saddle 90. Continued movement of saddle 90 to the extreme forward position shown in phantom outline snatches the trailing end of strip 12A from between loose frictional drive rollers 64 and 70 which thus slip to release the trailing end of strip 12A which drapes over shelf 94 of saddle 90.

Actuation of linkages 98 and 97 thus moves saddle assembly 74 and carriage 76 back under the discharge end of table 16 and forward in front of table 16 to receive, grab, snatch and drape successive trimmed strips 12A on saddle 90. Linkage 98 includes rotatably connected links 112, 113, 114 and 115. Link 112 is rotatably secured below table 16 on pivot 117. Curved link 115 is rotatably secured below the leading end of carriage 76 by pivot 119. Movement of pivoted actuating arm 110 in the return direction of the lower level of conveyor belt 22 by pin head 24 urges the top of link 110 in the return direction about pivot 117 to move linkage 98 into the withdrawn position shown in full outline in FIG. 3. This return movement is facilitated by weight 121, for example ten pounds, attached to the top of link 112.

In this full outline position of linkage 98 the bottom of rotatable clamping arm 104 which is rotatably connected to carriage 76 at pivot 107, forcefully contacts bumper 105 attached above track 80. This rotates arm 104 counterclockwise about pivot 107 against the force of spring 109 to move arm 104 away from skirt 108 of saddle 90. Then the leading end of strip 12A can enter between gripping pad 106 of arm 104 and padded skirt 108 of saddle 90, as shown in solid outline in FIG. 3. This once more opens a gap between clamping arm 104 and saddle 90 for receiving the next leading end of strip 12A.

I claim:

1. A centering cutting apparatus for trimming strips of material having a design comprising an elongated linear conveyor, said conveyor having a substantial loading area, a longitudinal pattern determining means on said loading area whereby a design on said strips of material is oriented with said longitudinal pattern as said strips are applied to said conveyor, a holding means on said conveyor for holding said strips on said conveyor as it traverses them, a cutting means mounted alongside said conveyor for edge trimming said strips on said conveyor with reference to said design on said strips, said holding means being constructed and arranged to release said strips after passage through said cutting means, said conveyor having means for discharging the trimmed strips after traversing said cutting means, said pattern determining means and said holding means are comprised of spaced pins protruding from said conveyor upon which said strips are impaled, said conveyor includes an elongated table, a moving conveyor under said table, a slot in said table, said moving conveyor being disposed closely adjacent said table to cause said pins to protrude upwardly through said table, a portion of said conveyor extending past said cutting means, and said portion of said conveyor extending past said cutting means being disposed relatively lower below said table to cause said pins to drop beneath said table and thus withdraw them from said strips.

2. An apparatus as set forth in claim 1 wherein said conveyor comprises an endless belt having a starting end disposed relatively close to said table to cause the pins in said loading area to protrude upwardly through said slot, said conveyor having a finishing end disposed on the other side of said cutting means from said starting end, and said finishing end being disposed a greater distance below said table than said starting end whereby said pins move below said table at said finishing end to release them from said strips.

3. An apparatus as set forth in claim 1 wherein said cutting means comprise a pair of cutters straddling said conveyor means.

4. An apparatus as set forth in claim 3 wherein said cutting means evenly straddles the longitudinal centerline of said conveyor whereby said strips are evenly trimmed on both sides of a centered design.

5. An apparatus as set forth in claim 4 wherein said cutting means comprise circular cutting discs.

6. An apparatus as set forth in claim 5 wherein a presser foot is mounted above said conveyor in the entrance to said cutting lines for gently holding said strips in position while they are being cut.

7. An apparatus as set forth in claim 6 wherein a pair of resilient fingers are mounted substantially parallel to said presser foot on the outside of said cutting lines for diverting the trimmed edges of said strips downwardly away from said conveyor.

8. An apparatus as set forth in claim 1 wherein said discharge means comprises a loose frictional drive capable of pulling and propelling said strips and also being capable of slipping relative to said strips when they are under the influence of a stronger force.

9. An apparatus as set forth in claim 8 wherein said pattern determining and holding means is comprised of spaced pins, and the trailing end of said strips being held on one of said pins when the leading end is engaged with said loose frictional drive which then slips relative to said strips.

10. An apparatus as set forth in claim 9 wherein said discharge means also comprises a stacking assembly disposed at the discharge end of said conveyor for receiving and stacking trimmed strips of material, said stacking assembly including a reciprocating carriage, a saddle mounted upon said carriage for receiving said strips, and a clamping means on said saddle for clamping the leading ends of said strips against said saddle whereby the trailing ends of said strips are snatched out of said loose frictional drive and draped over said saddle by its forward movement.

11. A centering cutting apparatus comprising an elongated table, an endless conveyor mounted under said table, a slot in said table over said endless conveyor, a row of pins mounted upon said conveyor and protruding outwardly therefrom, said conveyor having an upper path disposed adjacent said table and a lower path disposed below said table, a pair of cutters mounted upon said table to straddle said slot, a work-applying station on said table disposed before said pair of cutters for applying strips of material to be trimmed by said cutters on said conveyor, the upper path of said conveyor being disposed closely adjacent said table whereby said pins protrude upwardly through said table a sufficient distance to be engaged by strips of said material impaled upon them, said apparatus having means for releasing said strips from said pins after said strips have been transported by said pins through said cutters whereby said strips are trimmed to said predetermined width, and discharge means on said apparatus for discharging said trimmed strips.

12. An apparatus as set forth in claim 11 wherein the upper path of said conveyor after said cutters is disposed a sufficient distance below said table to withdraw said pins from said strips whereby said strips are disengaged for discharge from said apparatus.

13. An apparatus as set forth in claim 12 wherein the upper path of said conveyor is gradually inclined downwardly from the loading end to the discharge end whereby said pins are first disposed a substantial distance above said table for impaling said strips of fabric and then drop below said table after said cutters to release them from said strips.

14. An apparatus as set forth in claim 11 wherein a movable pressing foot is disposed between the entrance to said cutters and resting lightly upon said strip of material whereby it is maintained in position as it is trimmed by said cutters.

15. An apparatus as set forth in claim 14 wherein a pair of resilient fingers are disposed on the outer edges of said material trimmed by said cutters for depressing them below said table for discard.

16. An apparatus as set forth in claim 15 wherein said pair of resilient fingers are disposed parallel to said pressing foot and on outer sides of said cutters.

17. An apparatus as set forth in claim 11 wherein said discharge means comprises a pair of loose frictional gripping rollers disposed parallel and in loose contact with each other and having a nip between them disposed in the path of movement of said strips of said conveyor, a track connecting the end of said conveyor with said nip, and said gripping rollers loosely grasping the leading ends of said strips fed to them by said conveyor on said track and propelling them away from said apparatus.

18. An apparatus as set forth in claim 17 wherein said gripping rollers slip relative to said strips while the trailing ends of said strips are held on said pins.

19. An apparatus as set forth in claim 11 wherein a stacking assembly is disposed at the discharge end of said table for receiving and stacking said trimmed strips of material, said stacking assembly including a reciprocating carriage, a saddle mounted upon said carriage for receiving said strips, and a clamping means in said saddle for clamping and leading ends of said strips against said saddle whereby the trailing ends of said strips are snatched out of said loose frictional gripping rollers and draped over said saddle by its forward movement.

20. An apparatus is set forth in claim 19 wherein an operating linkage is connected to reciprocate said carriage indexing means on said conveyor, and an actuating control connecting said indexing means to move said operating linkage in coordination with said pins and strips.

21. An apparatus as set forth in claim 20 wherein said operating linkage comprises a motion multiplying linkage.

22. An apparatus as set forth in claim 19 wherein said clamping means comprises a clamping arm on said carriage, resilient means on said carriage urging said clamping arm to contact said saddle, and a bumper on said stacking assembly for reacting against said clamping arm to open it when said assembly is in position for receiving the leading edge of a trimmed strip.

* * * * *